United States Patent
Osborn et al.

(10) Patent No.: US 12,368,590 B2
(45) Date of Patent: Jul. 22, 2025

(54) COMPUTER-BASED SYSTEMS CONFIGURED TO DYNAMICALLY GENERATE AUTHENTICATION STEPS TO PERFORM AT LEAST ONE ACTION AND METHODS OF USE THEREOF

(71) Applicant: Capital One Services, LLC, McLean, VA (US)

(72) Inventors: Kevin Osborn, Newton Highlands, MA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 173 days.

(21) Appl. No.: 18/452,300

(22) Filed: Aug. 18, 2023

(65) Prior Publication Data

US 2025/0062902 A1    Feb. 20, 2025

(51) Int. Cl.
*H04L 9/32*       (2006.01)
*G06F 21/31*      (2013.01)
*G06F 21/32*      (2013.01)

(52) U.S. Cl.
CPC .......... *H04L 9/3213* (2013.01); *H04L 9/3231* (2013.01); *G06F 21/31* (2013.01); *G06F 21/32* (2013.01)

(58) Field of Classification Search
CPC ..... H04L 9/3213; H04L 9/3231; G06F 21/31; G06F 21/32
USPC ...................................................... 713/168
See application file for complete search history.

(56) References Cited

U.S. PATENT DOCUMENTS

| | | | |
|---|---|---|---|
| 9,813,236 B2 | 11/2017 | Buer | |
| 10,044,723 B1* | 8/2018 | Fischer | ................ H04L 63/102 |
| 10,812,473 B2* | 10/2020 | Ramesh Kumar | .. H04L 63/0807 |
| 11,245,679 B1* | 2/2022 | Su | ........................ G06F 21/31 |
| 2017/0243417 A1 | 8/2017 | Manikantan et al. | |
| 2017/0270723 A1 | 9/2017 | He et al. | |
| 2018/0139203 A1 | 5/2018 | Dolan et al. | |
| 2020/0051080 A1* | 2/2020 | Maheshwari | ......... H04L 9/3234 |

(Continued)

OTHER PUBLICATIONS

International Search Report and Written Opinion from International Application No. PCT/US2024/042874 dated Feb. 26, 2025.

*Primary Examiner* — Thanh T Le
(74) *Attorney, Agent, or Firm* — Greenberg Traurig, LLP

(57) ABSTRACT

In some embodiments, the present disclosure provides an exemplary method that may include steps of determining an identity of at least one user of a plurality of users based on a multi-factor authentication; utilizing an identity tokenizer to generate at least one temporary identity token associated with the identity of the user; transmitting the at least one temporary identity token to an external computing device for authentication; receiving an authenticated digital token from the external computing device; automatically utilizing the authenticated digital token to retrieve a plurality of data items of an account information; utilizing a security module to link the authenticated digital token and the plurality of data items; generating a unique-universal identifier associated with the security module and the authenticated digital token; and utilizing the unique-universal identifier and the security module associated with the authenticated digital token.

20 Claims, 8 Drawing Sheets

(56) References Cited

U.S. PATENT DOCUMENTS

| | | |
|---|---|---|
| 2020/0273032 A1 | 8/2020 | Narayan et al. |
| 2021/0234677 A1* | 7/2021 | Isenhour ............. H04L 63/0807 |
| 2023/0097804 A1 | 3/2023 | Rule et al. |
| 2024/0028688 A1* | 1/2024 | Shen ....................... G06F 21/36 |
| 2024/0154955 A1* | 5/2024 | Stalling ................. H04L 9/3234 |
| 2024/0396733 A1* | 11/2024 | Huang ................. H04L 9/3231 |
| 2025/0005963 A1* | 1/2025 | Johnsen ................. G02C 11/10 |

* cited by examiner

COMPUTER-BASED SYSTEMS CONFIGURED TO DYNAMICALLY GENERATE AUTHENTICATION STEPS TO PERFORM AT LEAST ONE ACTION AND METHODS OF USE THEREOF

FIELD OF TECHNOLOGY

The present disclosure generally relates to computer-based systems configured to dynamically generate authentication steps to perform at least one action and methods of use thereof.

BACKGROUND OF TECHNOLOGY

Typically, spam is directed to large numbers of users for the purposes of advertising, phishing, or spreading malware. Usually, spam includes all forms of unwanted communications including, but not limited to unsolicited calls or messages, caller identification spoofing, and robocalls. The goal or purpose of a spam call is to sell some goods that might be unsolicited or unwanted.

SUMMARY OF DESCRIBED SUBJECT MATTER

In some embodiments, the present disclosure provides an exemplary technically improved computer-based method that includes at least the following steps: dynamically determining, by at least one processor, in an augmented reality, an identity of at least one user of a plurality of users based on a multi-factor authentication; utilizing, by the at least one processor, an identity tokenizer to automatically generate at least one temporary identity token associated with the identity of the user for a first predetermined period of time; transmitting, by the at least one processor, the at least one temporary identity token to an external computing device for authentication of the identity of the user; receiving, by the at least one processor, in response to the transmitting of the at least one temporary identity token, an authenticated digital token from the external computing device to utilize the authenticated digital token for a second predetermined period of time; automatically utilizing, by the at least one processor, the authenticated digital token to retrieve a plurality of data items of an account information, stored in an encrypted form from a pre-generated database of encrypted data records; automatically utilizing, by the at least one processor, a security module to dynamically link the authenticated digital token and the plurality of data items; generating, by the at least one processor, a unique-universal identifier associated with the security module and the authenticated digital token to automatically authenticate a plurality of activities; and utilizing, by the at least one processor, the unique-universal identifier and the security module associated with the authenticated digital token to transmit instructions to a plurality of entities to exchange data in real-time to execute the plurality of activities in a physical realm.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
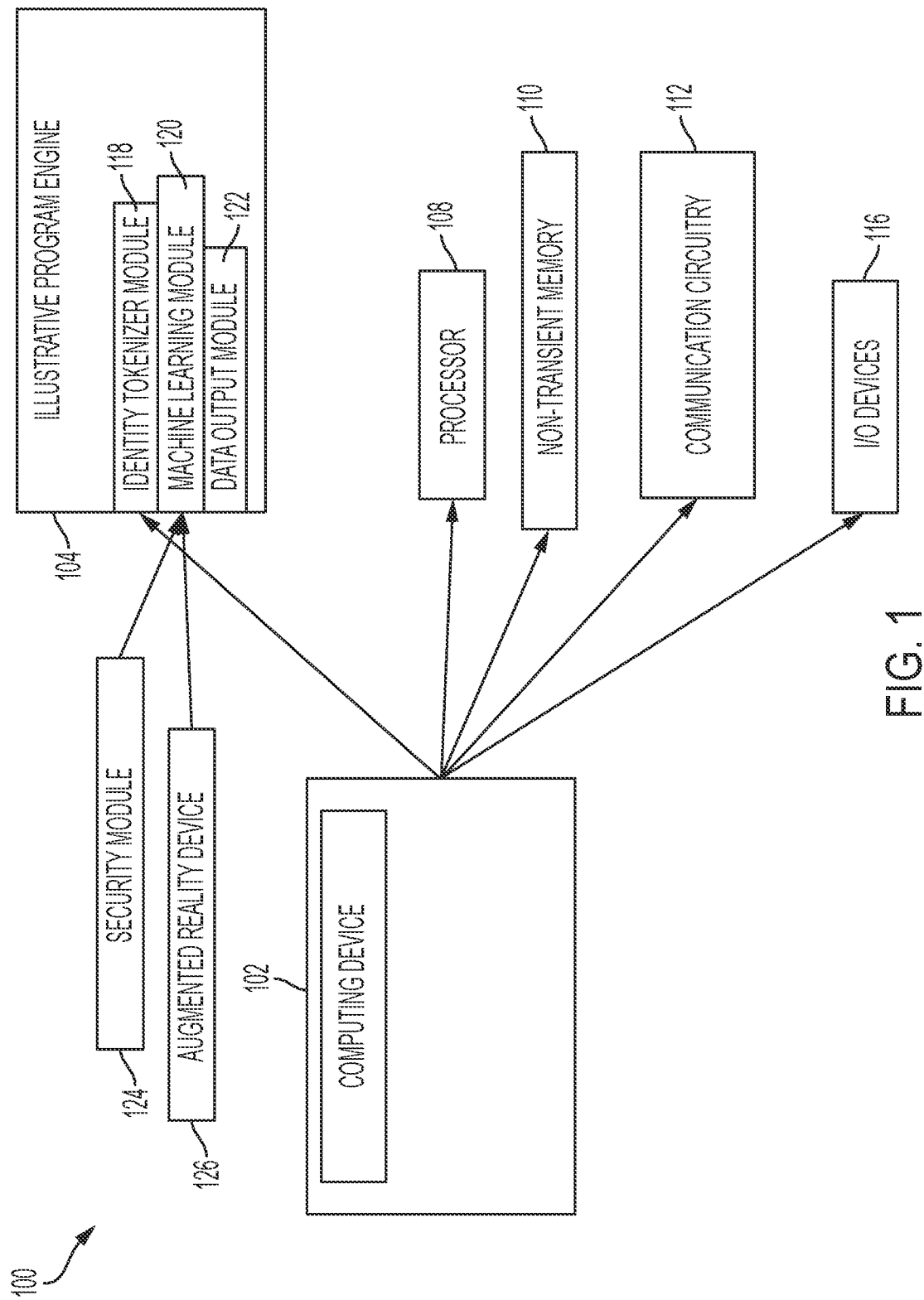
FIG. 1 depicts a block diagram of an exemplary computer-based system and platform for generating a unique-universal identifier associated with the security module and the authenticated digital token to automatically authenticate a plurality of activities, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Embodiments of the present disclosure recognize at least one technological computer-centered problem associated with generating designs of an entity using an augmented reality device to facilitate a purchase of at least one product. An illustrative technological computer-centered problem associated with the utilization of the augmented reality device arises typically when an observer's experience in the physical world is augmented with computer animations presented in an observer's context and virtual objects are displayed as an overlay over the physical world, which may enhance an observer's customer experience. The illustrative technological computer-centered problem may also arise in relation to searching, inspecting, and purchasing objects via a computer over the internet. The illustrative technological computer-centered problem increases potential security risks associated with the observer's customer experience to purchase objects using augment reality based on breaches of the augment reality and breaches of the internet. As detailed in at least some embodiments herein, at least one technological computer-centered solution associated with the illustrative technological computer-centered problem may be a dynamic utilization of a security module to link an authenticated token generated by an identity tokenizer module and account information associated with the identity of the observer. In some embodiments, the present disclosure may utilize the identity tokenizer module to automatically generate at least one token associated with the identity of the observer for a predetermined period of time. In some embodiments, the present disclosure may utilize the authenticated token for a different predetermined period of time. In some embodiments, the present disclosure may generate a universal-unique identifier associated with the authenticated token to automatically authenticate subsequent activities. In some embodiments, the present disclosure may utilize the unique-universal identifier and the security module to transmit a plurality of instructions to an entity to exchange data in real-time. In some embodiments, at least one technological computer-centered solution associated with the illustrative technological computer-centered problem may refer to automatically utilizing an illustrative trained machine learning algorithm to predict a frequency of encrypted data retrieved by the authenticated digital token. In some embodiments, the illustrative trained machine learning module may refer to the trained machine learning algorithm trained using an unsupervised learning and/or a semi-supervised learning for the predetermined period of time. For example, the machine learning module may include at least one of regression algorithm, instance-based algorithm, regularization algorithm, decision tree algorithm, Bayesian algorithm, clustering algorithm, associated rule learning algorithm, deep learning algorithm, dimensionality reduction algorithm, ensemble algorithm, and/or artificial neural network algorithm.

FIG. 1 depicts a block diagram of an exemplary computer-based system and platform for generating a unique-universal identifier associated with the security module and the authenticated digital token to automatically authenticate a plurality of activities, in accordance with one or more embodiments of the present disclosure.

In some embodiments, an illustrative computing system 100 of the present disclosure may include a computing device 102 associated with at least one user and an illustrative program engine 104. In some embodiments, the illustrative program engine 104 may be stored on the computing device 102. In some embodiments, the illustrative program engine 104 may be stored on the computing device 102, which may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may refer to at least one calling-enabled computing device of a plurality of calling-enabled computing devices. For example, the computing device 102 is an augmented reality device, a mobile device, a smart phone, and/or a laptop. In some instances, the computing device 102 may be the at least one augment reality computing device with an ability to execute a plurality of activities in augmented reality and digital. In some instances, at least one activity of the plurality of activities may refer to an ability to initiate an interaction session with an external computing device. In some embodiments, the at least one activity of the plurality of activities may operate discreetly during the execution of at least one other activity of the plurality of activities. For example, the at least one activity operates in the background of the computing device 102. In some embodiments, the server computing device 106 (not shown) may refer to a particular entity, (e.g., physical merchant, augmented reality merchant, and/or digital merchant) server computing device capable of generating shipping labels and initiating a delivery process associated with the exchanged data based on the use of a security module 124. In some embodiments, the security module 124 may refer to an offline process that verifies the authenticity of a transaction process via a terminal and/or point of sale system. For example, the security module 124 may refer to a EMV verification that automatically authenticates a transaction that occurs during the predetermined period of time initiated by the computing device 102 associated with the security module 124.

In some embodiments, the illustrative program engine 104 may be configured to instruct the processor 108 to execute one or more software modules such as, without limitation, an exemplary identity tokenizer module 118, a machine-learning module 120, and/or a data output module 122.

In some embodiments, an exemplary identity tokenizer module 118 of the present disclosure, utilizes a least one machine learning algorithm, described herein, to automatically generate at least one temporary identity token associated with the identity of a user for a predetermined period of time; automatically retrieve a plurality of data items of an account information from a pre-generated database of data records; and automatically utilize a security module 124 to dynamically link an authenticated digital token and the plurality of data items. For example, the dynamic link between the authenticated digital token and the plurality of data items may refer to storing at least one address data point in the data record associated with the authenticated digital token, where the at least one address data point may point to a computer storage file associated with at least one data item (e.g., a database record, a data file, a network resource, etc.). In some embodiments, the exemplary identity tokenizer module 118 may dynamically determine an identity of at least one user of a plurality of users based on a multi-factor authentication. In one embodiment, the exemplary identity tokenizer module 118 may dynamically determine the identity of the at least one user in an augmented reality. In some embodiments, the exemplary identity tokenizer module 118 may utilize an augmented reality device 126 that uses at least one bio-metric factor to identify the identity of the at least one user. For example, the exemplary identity tokenizer module 118 may use a fingerprint and/or retinal scan to allow a particular use to utilize the augmented reality device 126. In one embodiment, the multi-factor authentication may refer to a plurality of authentication factors (e.g., fingerprint, retinal scan, audio signature, SMS message, push message, token-generation, etc.) that may be used to identify an individual. In some embodiments, the exemplary identity tokenizer module 118 may automatically generate at least one temporary identity token associated with a particular identity of the user for a first predetermined period of time. For example, the temporary identity token may refer to a 256-digit alphanumerical sequence. In one embodiment, the at least one temporary identity token is associated with a plurality of types of activities. For example, the exemplary identity tokenizer module 118 may automatically generate an identity token for a short duration of time associated with access activities, security activities, and transaction activities. In some embodiments, the exemplary identity tokenizer module 118 may transmit the at least one temporary identity token to an external computing device for authentication of the identity of the user. In one embodiment, the external computing device may refer to the server computing device 106. In some embodiments, the exemplary identity tokenizer module 118 may transmit the at least one temporary identity token to a server computing device associated with an entity. In one embodiment, the entity may refer to a store that allows for online purchasing. In some embodiments, the exemplary identity tokenizer module 118 may receive an authenticated digital token from the external computing device to utilize the authenticated digital token for a second predetermined period of time. In one embodiment, the received, authenticated digital token may refer to a confirmation (e.g., a string of specific data) of the external computing device authenticating the temporary identity token based on an analysis of the identity of the user and the at least one bio-metric factor associated with the augmented reality device 126. In some embodiments, the exemplary identity tokenizer module 118 may automatically utilize the authenticated digital token to retrieve a plurality of data items from an account information stored in an encrypted form from a pre-generated database of encrypted data records. In some embodiments, the exemplary identity tokenizer module 118 may automatically utilize the security module 124 to dynamically link the authenticated digital token and the plurality of data items. In one embodiment, the security module 124 may be hosted within the augmented reality device 126. In some embodiments, the security module 124 may refer to an offline process that verifies the authenticity of a transaction process via a terminal and/or point of sale system. For example, the security module 124 may refer to a EMV verification that automatically authenticates a transaction that occurs during the predetermined period of time initiated by the computing device 102 associated with the security module 124. In certain embodiments, the security module 124 may communicate with specialized point of sale terminals associated with the augmented reality device 126 that allows for exchange of authenticated and verified data associated with the transaction in real time. In some embodiments, the exemplary identity tokenizer module 118 may generate a unique-universal identifier associated with the security module 124 and the authenticated digital token to automatically authenticate a plurality of activities. In some embodiments, the unique-universal identifier may refer to a personal identification number associated with the at least one user, where the term universal may refer to a uniformity associated with all devices associated with the at least one user. In some embodiments, the exemplary identity tokenizer module 118 may utilize the unique-universal identifier and the security module 124 associated with the authenticated digital token to transmit instructions to a plurality of entities to exchange data in real-time to execute the plurality of activities in a physical realm. In certain embodiments, the security module 124 may refer to a triple data encryption algorithm, which is a symmetric-key block cipher that applies a data encryption standard ("DES") three times to each data block. For example, the security module 124 may utilize the triple DES to identify a signature associated with a particular user based on a 56-bit key. In certain embodiments, the security module 124 may refer to an asymmetric algorithm using a key pair with a private key and a public key to extract customer information from a financial database, feed the extracted customer information into a data information system, and automatically writes that fed data onto the computing device 102. For example, the security module 124 may refer to a cyrpto-based asymmetric algorithm using a key pair to communicate, authenticate, and execute a plurality of actions in real time within the augmented reality device associated with the computing device 102. In some embodiments, the physical realm may refer to an image observed by the mind and perceived by the body within the natura world. In some embodiments, the data may refer to data being exchanged and needs to convert a digital item into a physical item, where the data being exchanged, includes sub-data needed to convert a digital item into a physical item. In some embodiments, the exemplary identity tokenizer module 118 may utilize the machine learning module 120 to dynamically predict a frequency of encrypted data retrieved by the authenticated digital token.

In some embodiments, the present disclosure describes systems for automatically utilizing at least one trained machine learning algorithm of a plurality of machine learning algorithms within the machine learning module 120 that may automatically generate at least one temporary identity token associated with the identity of the user for the first predetermined period of time. In some embodiments, the machine learning module 120 may transmit the at least one temporary identity token to an external computing device for authentication of the identity of the user. In some embodiments, the machine learning module 120 may receive an authenticated digital token from the external computing device to utilize the authenticated digital token for a second predetermined period of time. In some embodiments, the machine learning module 120 may automatically utilize the authenticated digital token to retrieve a plurality of data items from an account information stored in an encrypted form from a pre-generated database of encrypted data records. In some embodiments, the machine learning module 120 may automatically utilize the security module 124 to dynamically link the authenticated digital token and the plurality of data items. In some embodiments, the machine learning module 120 may utilize the unique-universal identifier and the security module 124 associated with the authenticated digital token to transmit instructions to a plurality of entities to exchange data in real-time to execute the plurality of activities in a physical realm.

In some embodiments, the data output module 122 may generate at least one temporary identity token associated with the identity of the user for the first predetermined period of time. In some embodiments, the data output module 122 may transmit the at least one temporary identity token to the external computing device associated with the entity for authentication of the identity of the user. In some embodiments, the data output module 122 may receive the authenticated digital token from the external computing device to utilize the authenticated digital token for the second predetermined period of time. In some embodiments, the data output module 122 may retrieve a plurality of data items of an account information, stored in an encrypted form from a pre-generated database of encrypted data records. In some embodiments, the data output module 122 may dynamically link the authenticated digital token and the plurality of data items. In some embodiments, the data output module 122 may transmit instructions to a plurality of entities to exchange data in real-time to execute the plurality of activities in a physical realm.

In some embodiments, the illustrative program engine 104 may dynamically determine an identity of at least one user of a plurality of users based on a multi-factor authentication. In some embodiments, the illustrative program engine 104 may utilize the exemplary identity tokenizer module 118 to automatically generate at least one temporary identity token associated with the identity of the user for a first predetermined period of time. In some embodiments, the illustrative program engine 104 may transmit the at least one temporary identity token to an external computing device for authentication of the identity of the user. In some embodiments, the illustrative program engine 104 may receive an authenticated digital token from the external computing device to utilize the authenticated digital token for a second predetermined period of time in response to transmitting the at least one temporary identity token. In some embodiments, the illustrative program engine 104 may automatically utilize the authenticated digital token to retrieve a plurality of data items of an account information, stored in an encrypted form from a pre-generated database of encrypted data records. In some embodiments, the illustrative program engine 104 may automatically utilize the security module 124 to dynamically link the authenticated digital token and the plurality of data items. In some embodiments, the illustrative program engine 104 may generate a unique-universal identifier associated with the security module 124 and the authenticated digital token to automatically authenticate a plurality of activities. In some embodiments, the illustrative program engine 104 may utilize the unique-universal identifier and the security module 124 associated with the authenticated digital token to transmit instructions to a plurality of entities to exchange data in real-time to execute the plurality of activities in a physical realm.

In some embodiments, the non-transient memory 110 may store the identity of the plurality of users. In some embodiments, the non-transient memory 110 may store the generated temporary identity token associate with the identity of the user. In some embodiments, the non-transient memory 110 may store at least one authenticated digital token received from the server computing device 106 associated with the entity. In some embodiments, the non-transient memory 110 may store the retrieved plurality of data items associated with account information of the user stored in an encrypted form from a pre-generated database of encrypted data records. In some embodiments, the non-transient memory 110 may store the generated unique-universal identifier associated with the security module 124 and the authenticated digital token. In some embodiments, the non-transient memory 110 may store the plurality of factors needed to access the augmented reality device 126. In some embodiments, the non-transient memory 110 may store instructions associated with the data being exchanged, which includes sub-data needed to convert a digital item into a physical item.

Figure 2:
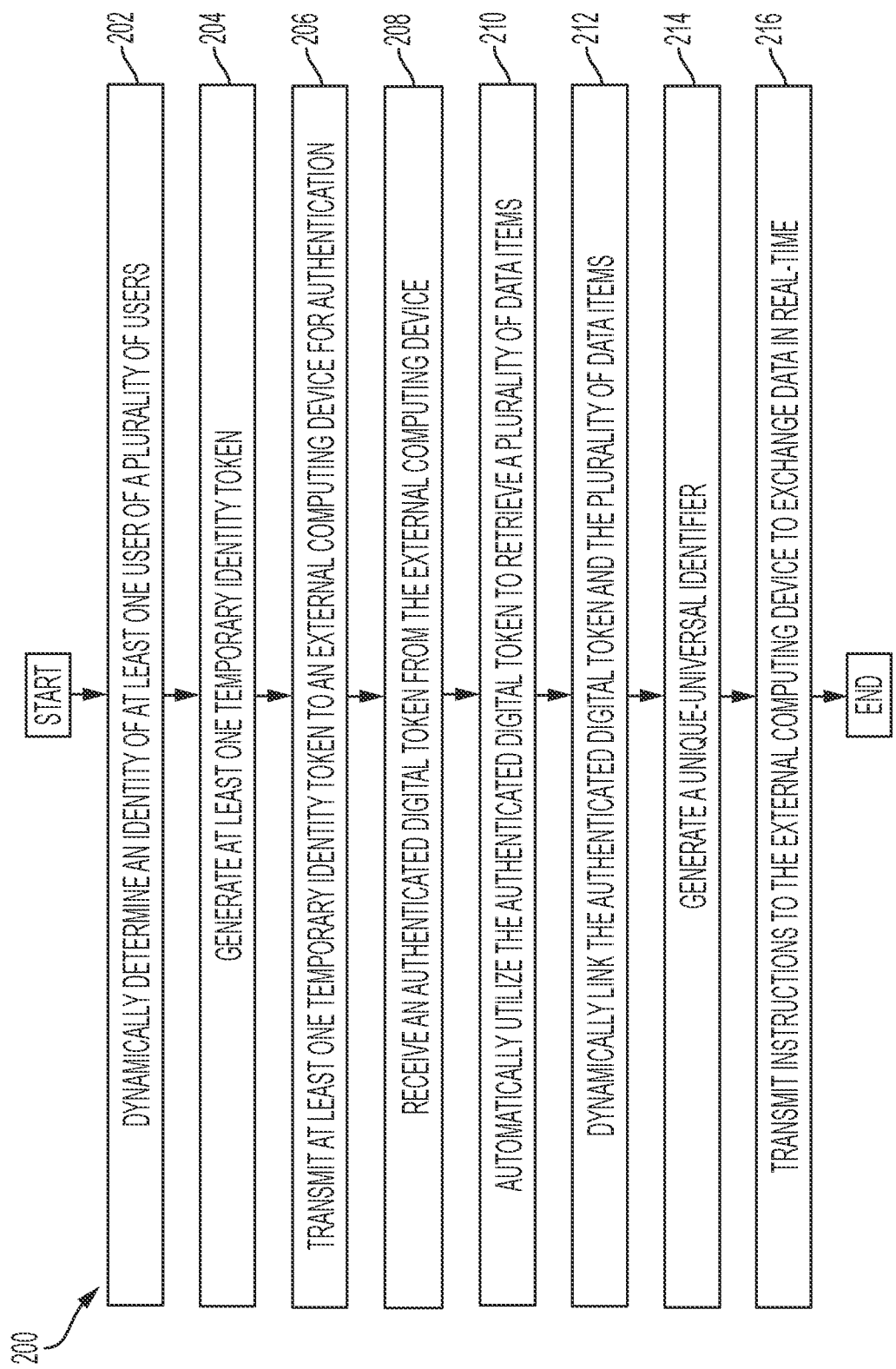
FIG. 2 is a flowchart illustrating operational steps for generating a unique-universal identifier associated with the security module and the authenticated digital token to automatically authenticate a plurality of activities, in accordance with one or more embodiments of the present disclosure.

FIG. 2 is a flowchart 200 illustrating operational steps for generating a unique-universal identifier associated with the security module and the authenticated digital token to automatically authenticate a plurality of activities, in accordance with one or more embodiments of the present disclosure.

In step 202, the illustrative program engine 104 within the computing device 102 may be programmed to dynamically determine an identity of at least one user of a plurality of users. In some embodiments, the illustrative program engine 104 may dynamically determine the identity of the at least one user of the plurality of users based on a multi-factor authentication. In some embodiments, the illustrative program engine 104 may utilize an augmented reality device 126 to dynamically determine the identity of the at least one user of the plurality of users based on the multi-factor authentication. In one embodiment, the augmented reality device 126 is associated with the at least one user and overlays an augmented reality over the real world so that only the user can observe the augmented overlay. In one embodiment, the augmented reality device 126 utilizes at least one bio-metric factor to identify the identity of the at least one user. For example, the illustrative program engine 104 may utilize the augmented reality device 126 to determine the identity of the user based on retinal scans and/or fingerprint analysis associated with the user. In some embodiments, the exemplary identity tokenizer module 118 may dynamically determine the identity of the at least one user of the plurality of users based on the multi-factor authentication. In some embodiments, the multi-factor authentication may refer to a plurality of steps, where a user selects at least one digital asset of a plurality of digital assets from a digital asset repository; receive a social network attribute associated with the user; receive a user interaction attribute associated with the user; update the user profile associated with the user; and dynamically utilize the machine learning module 120 to select a different digital asset of the plurality of digital assets from the digital asset repository.

In step 204, the illustrative program engine 104 may generate at least one temporary identity token. In some embodiments, the illustrative program engine 104 may generate the at least one temporary identity token associated with the identity of the user for a first predetermined period of time. In some embodiments, the illustrative program engine 104 may utilize the exemplary identity tokenizer module 118 to automatically generate the at least one temporary identity token associated with the identity of the user for the first predetermined period of time. In other embodiments, the at least one temporary identity token may be associated with a plurality of types of activities. For example, the at least one temporary identity token may allow a user to perform a transaction activity with an entity within the first predetermined period of time. In some embodiments, the exemplary identity tokenizer module 118 may automatically generate the at least one temporary identity token associated with the identity of the user for the first predetermined period of time.

In step 206, the illustrative program engine 104 may transmit the at least one temporary identity token to an external computing device for authentication. In some embodiments, the illustrative program engine 104 may transmit the at least one temporary identity token to the external computing device for authentication of the identity of the at least one user. In other embodiments, the external computing device may refer to the server computing device 106. In other embodiments, the external computing device may be associated with at least one entity and utilized by the at least one user within the augmented reality device 126. In some embodiments, the exemplary identity tokenizer module 118 may transmit the at least one temporary identity token to the external computing device for authentication of the identity of the at least one user. In some embodiments, the temporary token may expire upon expiration of the predetermined period of time.

In step 208, the illustrative program engine 104 may receive an authenticated digital token from the external computing device. In some embodiments, the illustrative program engine 104 may receive the authenticated digital token from the external computing device in response to transmitting the at least one temporary digital token. In some embodiments, the illustrative program engine 104 may receive the authenticated digital token from the server computing device 106 to utilize the authenticated digital token for a second predetermined period of time. In some embodiments, the second predetermined period of time may refer to a period of time with a shorter duration than the first predetermined period of time, allowing for an agent of the entity to verify the authentication of the digital token. In other embodiments, the illustrative program engine 104 may receive the authenticated digital token from the server computing device 106 to utilize the authenticated digital token for the second predetermined period of time, where receiving the authenticated digital token may refer to a confirmation of the server computing device 106 authenticating the temporary identity token based on an analysis of the identity of the user and the at least one bio-metric factor associated with the augmented reality device 126. In some embodiments, the analysis of the identity of the user ad the at least one bio-metric may be performed by the machine learning module 120. In some embodiments, the exemplary identity tokenizer module 118 may receive the authenticated digital token from the server computing device 106 to utilize the authenticated digital token for the second predetermined period of time.

In step 210, the illustrative program engine 104 may automatically utilize the authenticated digital token to retrieve a plurality of data items. In some embodiments, the illustrative program engine 104 may automatically utilize the authenticated digital token to retrieve the plurality of data items stored in an encrypted form from a pre-generated database of encrypted data records. In some embodiments, the plurality of data items may refer to a plurality of goods digitized to be displayed as encrypted data records. In other embodiments, the plurality of data items may refer to items of account information associated with the at least one user. For example, the illustrative program engine 104 may automatically utilize the authenticated digital token to retrieve an encrypted item to be sold from the entity during the duration of the first predetermined period of time. In some embodiments, the exemplary identity tokenizer module 118 may automatically utilize the authenticated digital token to retrieve the plurality of data items stored in the encrypted form from the pre-generated database of encrypted data records.

In step 212, the illustrative program engine 104 may dynamically link the authenticated digital token and the plurality of data items. In some embodiments, the illustrative program engine 104 may automatically utilize a security module 124 to dynamically link the authenticated digital token and the plurality of data items. In some embodiments, the security module 124 may be hosted within the augmented reality device 126. In other embodiments, the security module 124 may be associated with each user of the plurality of users based on the multi-factor authentication. In some embodiments, the exemplary identity tokenizer module 118 may utilize the security module 124 to dynamically link the authenticated digital token and the plurality of data items. In some embodiments, the dynamical linkage between the digital token and the plurality of data items allows the at least one user to engage in at least one shopping activity within the augmented reality utilizing the augmented reality device 126.

In step 214, the illustrative program engine 104 may generate a unique-universal identifier. In some embodiments, the illustrative program engine 104 may generate the unique-universal identifier associated with the security module 124 and the authenticated digital token. In some embodiments, illustrative program engine 104 may generate the unique-universal identifier associated with the security module 124 and the authenticated digital token to automatically authenticate a plurality of activities. In some embodiments, the plurality of activities may refer to exchanging the authenticated digital token for a physical item during the duration of the first predetermined period of time. In other embodiments, the unique-universal identifier may refer to a personal identification number associated with the at least one user. In some embodiments, the unique-universal identifier may refer to a personal identification number associated with the augmented reality device 126. In some embodiments, the exemplary identity tokenizer module 118 may generate the unique-universal identifier associated with the security module 124 and the authenticated digital token to automatically authenticate the plurality of activities.

In step 216, the illustrative program engine 104 may transmit instructions to the external computing device 106 to the data being exchanged includes sub-data needed to convert a digital item into a physical item in real-time. In some embodiments, the illustrative program engine 104 may utilize the unique-universal identifier and the security module 124 associated with the authenticated digital token to transmit instructions to a plurality of entities to exchange data in real-time to execute the plurality of activities in a physical realm. In some embodiments, the exchange data may refer to data needed to convert a digital item into a physical item. For example, a user may utilize the security module 124 within the augmented reality device 126 associate with the identify of the user to generate a digital token that may converted into a good or commodity during the duration of the first period of time. In some embodiments, the exemplary identity tokenizer module 118 may utilize the unique-universal identifier and the security module 124 associated with the authenticated digital token to transmit instructions to the server computing devices 106 associated with the plurality of entities to exchange data in real-time to execute the plurality of activities in the physical realm.

In some embodiments, the illustrative program engine 104 may utilize the machine learning module 120 to dynamically predict a frequency of encrypted data retrieved by the authenticated digital token. In some embodiments, the frequency of encrypted data retrieved by the authenticated digital token may refer to a historical shopping pattern associated with the at least one user. In some embodiments, the exemplary identity tokenizer module 118 may utilize the machine learning module 120 to dynamically predict a frequency of encrypted data retrieved by the authenticated digital token.

Figure 3:
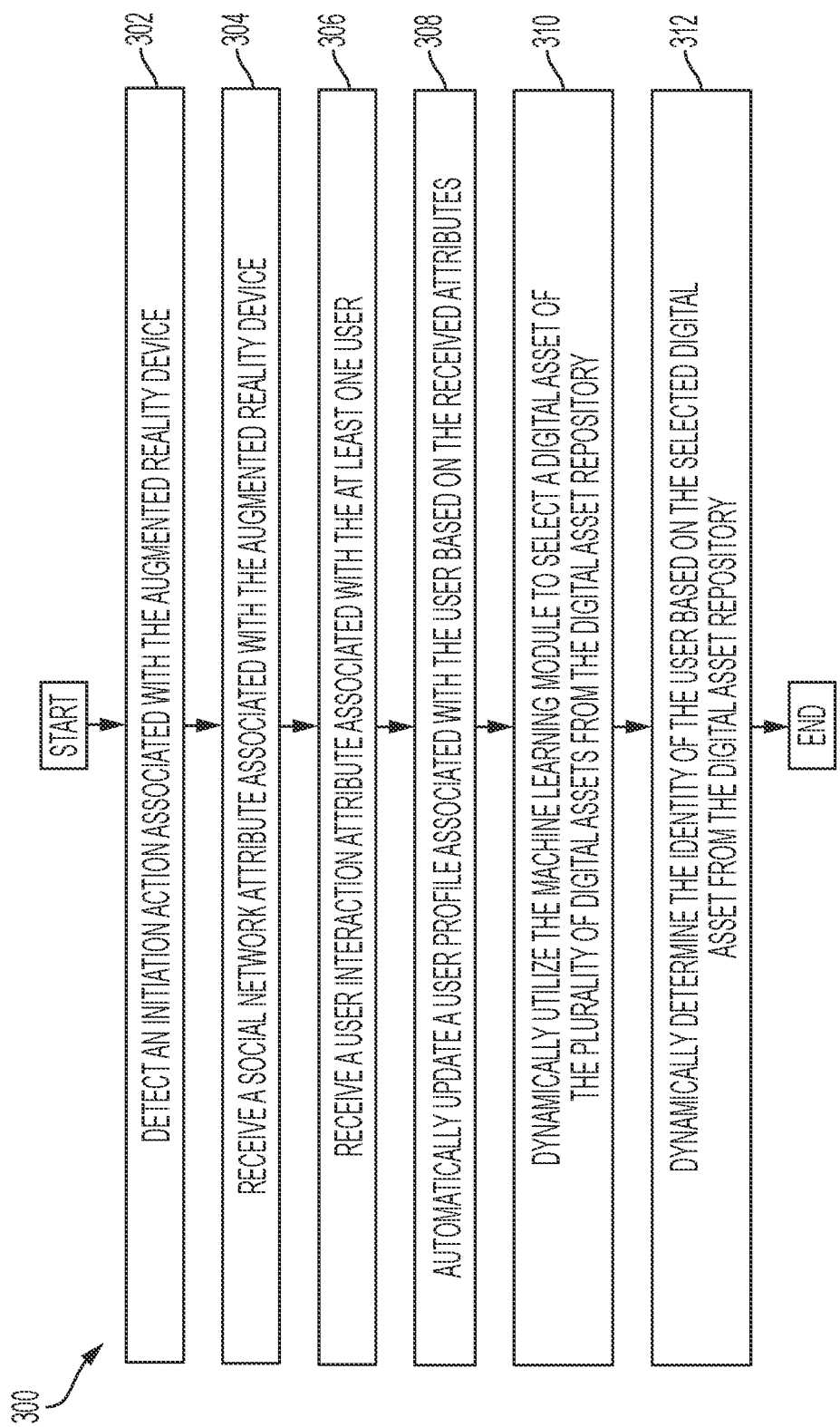
FIG. 3 is a flowchart illustrating operational steps of automatically utilizing an augmented reality device to dynamically determine the identity of the at least one user of the plurality of users based on the multi-factor authentication, in accordance with one or more embodiments of the present disclosure.

FIG. 3 is a flowchart 300 illustrating operations steps for automatically determining, in an augmented reality, an identity of at least one user of a plurality of users based on a multi-factor authentication, in accordance with one or more embodiments of the present disclosure.

In step 302, the illustrative program engine 104 may detect an initiation action associated with the augmented reality device 126. In some embodiments, the initiation action may refer to a user pressing an on button, voice command, or bio-metric authentication. In some embodiments, the illustrative program engine 104 may detect a plurality of initiation actions associated with at least one user. In some embodiments, the exemplary identity tokenizer module 118 may detect the initiation action associated with the augmented reality device 126.

In step 304, the illustrative program engine 104 may receive a social network attribute associated with the augmented reality device 126. In some embodiments, the social network attribute may refer to a geo-fence location, a known wi-fi address, or a log-in credential associated with a particular social network. In other embodiments, the social network attribute may refer to an assigned value to a factor of authentication associated with the above listed examples, where there is a range of one to five, with one being the least similar and five being the most similar. In some embodiments, the illustrative program engine 104 may receive the social network attribute associated with the augmented reality device 126 during a predetermined period of time associated with the detection of the initiation action. In some embodiments, the utilize the machine learning module 120 to predict an identity associated with the user based on a determined frequency of particular social network attributes identified over a period of time. In some embodiments, the exemplary identity tokenizer module 118 may receive a social network attribute associated with the augmented reality device 126 during a predetermined period of time associated with the detection of the initiation action.

In step 306, the illustrative program engine 104 may receive a user interaction attribute associated with the at least one user. In some embodiments, the illustrative program engine 104 may receive the user interaction attribute associated with the at least one user simultaneously with receiving the social network attribute associated with the augmented reality device 126. In some embodiments, the user interaction attribute may refer to a plurality of user preferences that are assigned values based on importance to the at least one user, where a particular digital item, a particular price range, and/or a particular brand of digital item may be quantified as user interaction attributes for the augmented reality device 126. In some embodiments, the exemplary identity tokenizer module 118 may receive the user interaction attribute associated with the at least one user simultaneously with receiving the social network attribute associated with the augmented reality device 126.

In step 308, the illustrative program engine 104 may automatically update a user profile associated with the user based on the received interaction attributes. In some embodiments, the illustrative program engine 104 may automatically update the user profile associated with the user based on the received social network attribute and the user interaction attribute at particular points of time. In some embodiments, the user profile may refer to an adaptive profile associated with the augmented reality device 126 that gains additional information associated with the user during each initiation activity. In some embodiments, the exemplary identity tokenizer module 118 automatically update the user profile associated with the user based on the received social network attribute and the user interaction attribute at particular points of time.

In step 310, the illustrative program engine 104 may dynamically utilize the machine learning module 120 to select a digital asset of the plurality of digital assets from the digital asset repository. In some embodiments, the digital asset may refer to a known identity associated with a particular user of the plurality of users. In other embodiments, the digital asset may refer to the updated user profile associated with the augmented reality device 126. In some embodiments, the digital asset repository may refer to a pre-generated database of a plurality of user profiles associated with the augmented reality device 126. In some embodiments, the exemplary identity tokenizer module 118 may dynamically utilize the machine learning module 120 to select a digital asset of the plurality of digital assets from the digital asset repository.

In step 312, the illustrative program engine 104 may dynamically determine the identity of the user based on the selected digital asset from the digital asset repository. In some embodiments, the illustrative program engine 104 may dynamically determine the identity of the user based on the updated user profile from the digital asset repository. In some embodiments, the exemplary identity tokenizer module 118 may dynamically determine the identity of the user based on the selected digital asset from the digital asset repository.

Figure 4:
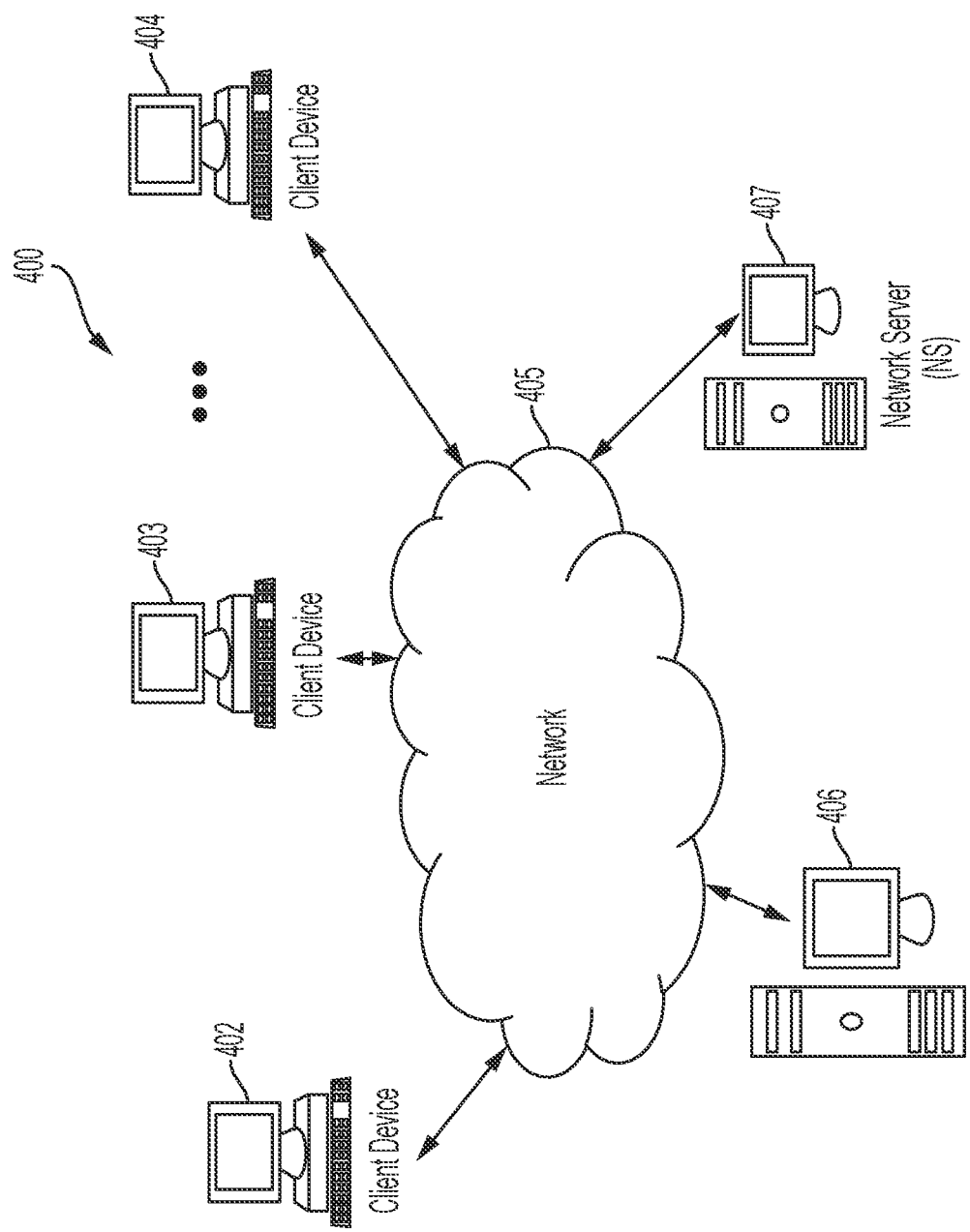
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured dynamically determine, in an augmented reality, an identity of at least one user of a plurality of users based on a multi-factor authentication and generate a unique-universal identifier associated with the security module and the authenticated digital token to automatically authenticate a plurality of activities, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary identity tokenizer module 118 of the present disclosure, automatically utilizing at least one machine-learning model described herein.

In some embodiments, referring to FIG. 4, members 402-404 (e.g., clients) of the exemplary computer-based system/platform 400 may include virtually any computing device capable of automatically updating, dynamically removing, and automatically restoring a plurality of data records within a generated database of known queries via a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary identity tokenizer module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to generate at least one temporary identity token; automatically utilize the security module 124 to dynamically link the authenticated digital token and a plurality of data items; and generate the unique-universal identifier associated with the security module 124 and the authenticated digital token to automatically authenticate a plurality of activities.

Figure 5:
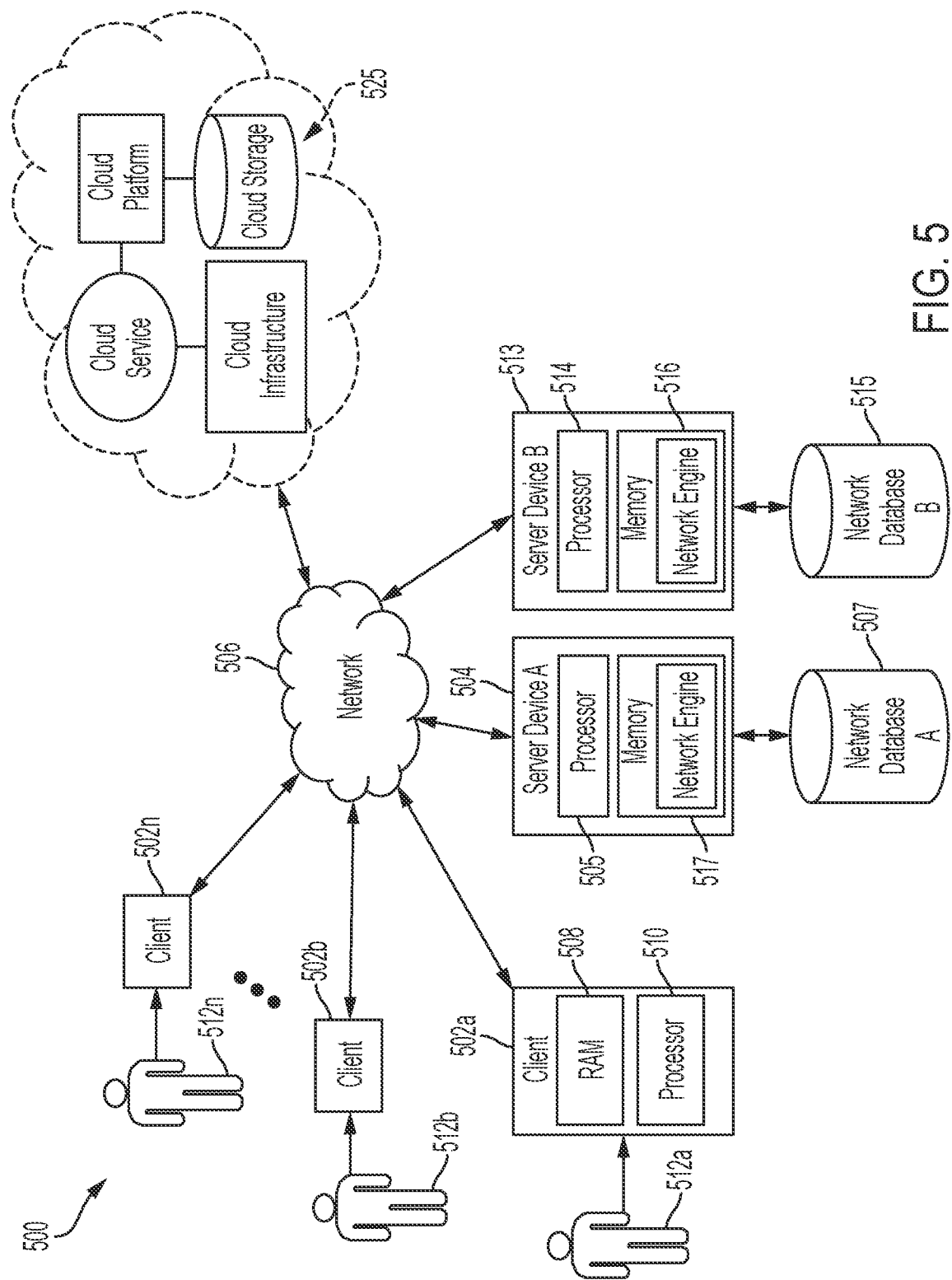
FIG. 5 depicts a block diagram of another exemplary computer-based system/platform in accordance with one or more embodiments of the present disclosure

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
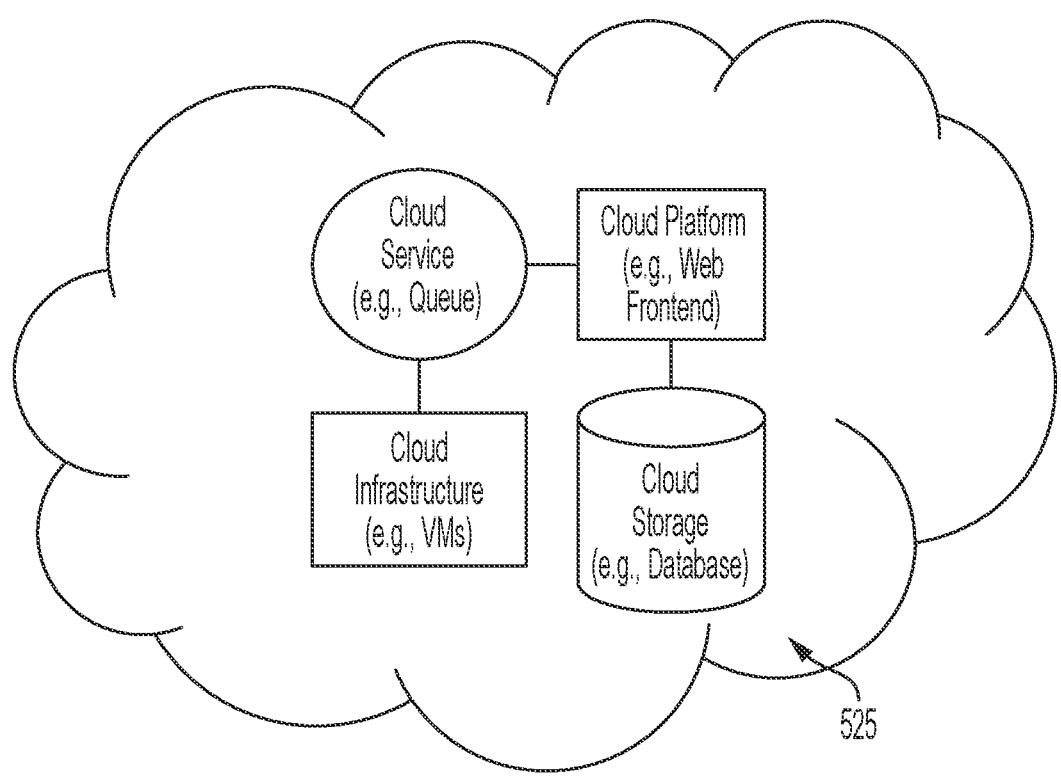
FIGS. 6 and 7 are diagrams illustrating implementations of cloud computing architecture/aspects with respect to which the disclosed technology may be specifically configured to operate, in accordance with one or more embodiments of the present disclosure.
Figure 7:
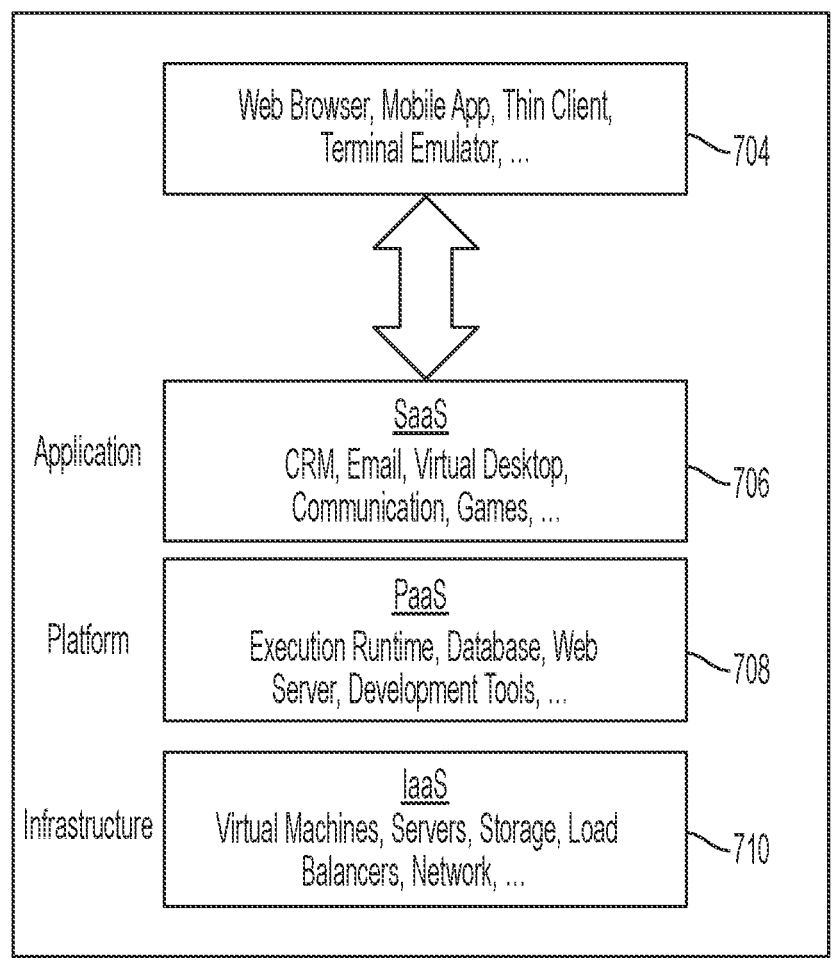

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/ architecture such as, but not limiting to: infrastructure a service (IaaS) 710, platform as a service (PaaS) 708, and/or software as a service (SaaS) 706.

Figure 8:
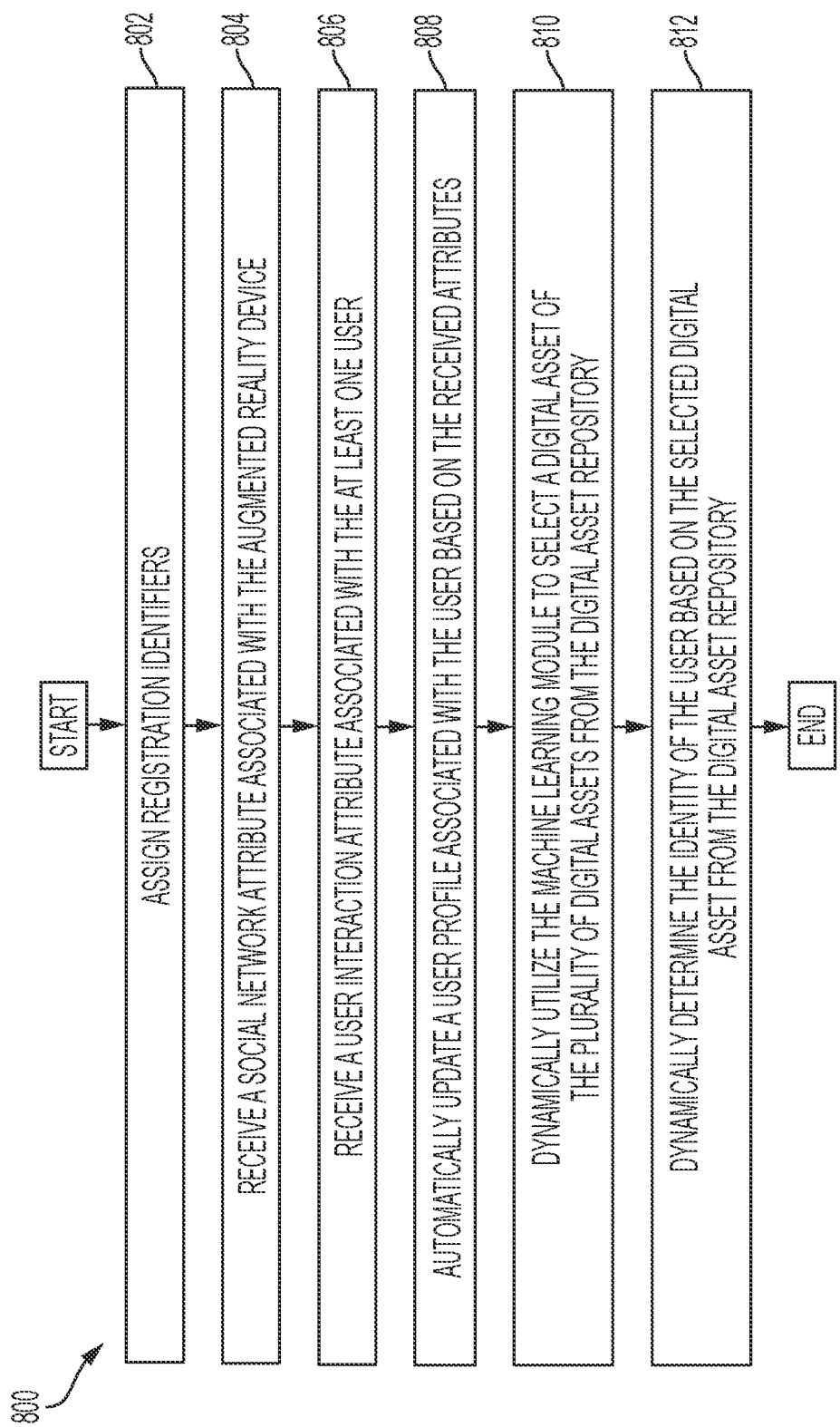
FIG. 8 is a flowchart illustrating operational steps for dynamically determining the identity of the user based on selected digital assets, in accordance with one or more embodiments of the present disclosure.

FIG. 8 is a flowchart 800 illustrating operational steps for dynamically determining the identity of the user based on the selected digital asset, in accordance with at least one embodiment of the present disclosure.

In step 802, the illustrative program engine 104 may assign registration identifiers. In some embodiments, the illustrative program engine 104 may utilize the security module 124 to assign registration identifiers associated with the computing device 102 based on the particular user. In certain embodiments, the illustrative program engine 104 may utilize the security module 124 within the augmented reality device associated with the computing device 102 to assign registration identifiers. In certain embodiments, the registration identifiers may refer to a plurality of registration identifiers associated with ownership rights assigned to the computing device 102. In some embodiments, the exemplary identity tokenizer module 118 may utilize the security module 124 to assign registration identifiers associated with the computing device 102 based on the particular user.

In step 804, the illustrative program engine 104 may receive a social network attribute associated with the augmented reality device. In some embodiments, the illustrative program engine 104 may receive a plurality of social network attributes associated with the computing device 102 based on the particular user and the assigned registration identifiers. In some embodiments, the plurality of social network attributes may refer to a plurality of detectable factors that provide additional information related to a plurality of user interaction attributes associated with the computing device 102. In some embodiments, the exemplary identity tokenizer module 118 may receive the plurality of social network attributes associated with the computing device 102 based on the particular user and the assigned registration identifiers.

In step 806, the illustrative program engine 104 may receive a user interaction attribute associated with the at least one user. In some embodiments, the illustrative program engine 104 may receive a plurality of user interaction attributes associated with the at least one user in response to receiving the social network attribute associated with the computing device 102. In certain embodiments, the user interaction attribute may refer to at least one received user preference based on a historical pattern of interaction associated with the particular user. In some embodiments, the exemplary identity tokenizer module 118 may receive the plurality of user interaction attributes associated with the at least one user in response to receiving the social network attribute associated with the computing device 102.

In step 808, the illustrative program engine 104 may automatically update a user profile associated with the user based on the user interaction attributes. In some embodiments, the illustrative program engine 104 may automatically update a plurality of user profiles associated with the plurality of users based on the plurality of user interaction attributes associated with each user. In certain embodiments, the user profile may refer to a database and/or collection of previously received user interaction attributes received over a period of time. In some embodiments, the exemplary identity tokenizer module 118 may automatically update the plurality of user profiles associated with the plurality of users based on the plurality of user interaction attributes associated with each user.

In step 810, the illustrative program engine 104 may select a digital asset of a plurality of digital assets from a digital asset repository. In some embodiments, the illustrative program engine 104 may dynamically utilize the machine learning module 120 to select the digital asset of the plurality of digital assets from the digital asset repository associated with the particular user based on the automatic update to the user profile. In certain embodiments, the digital asset may refer to sensitive financial information associated with the particular user and required to execute a transaction. In some embodiments, the exemplary identity tokenizer module 118 may dynamically utilize the machine learning module 120 to select the digital asset of the plurality of digital assets from the digital asset repository associated with the particular user based on the automatic update to the user profile.

In step 812, the illustrative program engine 104 may dynamically determine the identity of the user. In some embodiments, the illustrative program engine 104 may dynamically determine the identity of the user based on the selected digital asset from the digital asset repository. In certain embodiments, the digital asset repository may refer to a database of personal account information associated with a particular entity, specifically a bank. In some embodiments, the exemplary identity tokenizer module 118 may dynamically determine the identity of the user based on the selected digital asset from the digital asset repository.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: dynamically determining, by at least one processor, in an augmented reality, an identity of at least one user of a plurality of users based on a multi-factor authentication; automatically utilizing, by the at least one processor, an identity tokenizer module to automatically generate at least one temporary identity token associated with the identity of the user for a first predetermined period of time; transmitting, by the at least one processor, the at least one temporary identity token to an external computing device for authentication of the identity of the user; receiving, by the at least one processor, in response to the transmitting of the at least one temporary identity token, an authenticated digital token from the external computing device to utilize the authenticated digital token for a second predetermined period of time; automatically utilizing, by the at least one processor, the authenticated digital token to retrieve a plurality of data items of an account information, stored in an encrypted form from a pre-generated database of encrypted data records; automatically utilizing, by the at least one processor, a security module to dynamically link the authenticated digital token and the plurality of data items; generating, by the at least one processor, a unique-universal identifier associated with the security module and the authenticated digital token to automatically authenticate a plurality of activities; and automatically utilizing, by the at least one processor, the unique-universal identifier and the security module associated with the authenticated digital token to transmit instructions to a plurality of entities to exchange data in real-time to execute the plurality of activities in a physical realm.

Clause 2. The method according to clause 1, where in the augmented reality, the at least one user utilizes an augmented reality device that utilizes at least one bio-metric factor to identify the identity of the at least one user.

Clause 3. The method according to clause 1 or 2, where the at least one temporary identity token is associated with a plurality of types of activities.

Clause 4. The method according to clause 1, 2 or 3, where the external computing device is associated with at least one entity to be utilized by the at least one user within the augmented reality.

Clause 5. The method according to clause 1, 2, 3 or 4, where the receiving of the authenticated digital token includes receiving, by the at least one processor, a confirmation of the external computing device authenticating the temporary identity token based on an analysis of the identity of the user and the at least one bio-metric factor associated with the augmented reality device.

Clause 6. The method according to clause 1, 2, 3, 4 or 5, where the security module communicates with the augmented reality device.

Clause 7. The method according to clause 1, 2, 3, 4, 5 or 6, the unique-universal identifier includes a personal identification number associated with the at least one user.

Clause 8. The method according to clause 1, 2, 3, 4, 5, 6 or 7, the data being exchanged, further comprises sub-data needed to convert a digital item into a physical item.

Clause 9. The method according to clause 1, 2, 3, 4, 5, 6, 7 or 8, further including inputting, by at least one processor, the data being exchanged into a trained machine learning algorithm to dynamically predict a frequency of encrypted data retrieved by the authenticated digital token.

Clause 10. A method may include: dynamically determining, by at least one processor, in an augmented reality, an identity of at least one user of a plurality of users based on a multi-factor authentication; automatically utilizing, by the at least one processor, an identity tokenizer module to automatically generate at least one temporary identity token associated with the identity of the user for a first predetermined period of time; transmitting, by the at least one processor, the at least one temporary identity token to an external computing device for authentication of the identity of the user; receiving, by the at least one processor, in response to the transmitting of the at least one temporary identity token, an authenticated digital token from the external computing device to utilize the authenticated digital token for a second predetermined period of time; automatically utilizing, by the at least one processor, the authenticated digital token to retrieve a plurality of data items of an account information, stored in an encrypted form from a pre-generated database of encrypted data records; inputting, by at least one processor, the data being exchanged into a trained machine learning algorithm to dynamically predict a frequency of encrypted data retrieved by the authenticated digital token; automatically utilizing, by the at least one processor, a security module to dynamically link the authenticated digital token, the predicted frequency of encrypted data, and the plurality of data items; generating, by the at least one processor, a unique-universal identifier associated with the security module and the authenticated digital token to automatically authenticate a plurality of activities; and automatically utilizing, by the at least one processor, the unique-universal identifier and the security module associated with the authenticated digital token to transmit instructions to a plurality of entities to exchange data in real-time to execute the plurality of activities in a physical realm.

Clause 11. The method according to clause 10, where, in the augmented reality, the at least one user utilizes an augmented reality device that utilizes at least one bio-metric factor to identify the identity of the at least one user.

Clause 12. The method according to clause 10 or 11, where the at least one temporary identity token is associated with a plurality of types of activities.

Clause 13. The method according to clause 10, 11, or 12, where the external computing device is associated with at least one entity to be utilized by the at least one user within the augmented reality.

Clause 14. The method according to clause 10, 11, 12 or 13, where the receiving of the authenticated digital token includes receiving, by the at least one processor, a confirmation of the external computing device authenticating the temporary identity token based on an analysis of the identity of the user and the at least one bio-metric factor associated with the augmented reality device.

Clause 15. The method according to clause 10, 11, 12, 13 or 14, where the security module communicates with the augmented reality device.

Clause 16. The method according to clause 10, 11, 12, 13, 14 or 15, where the unique-universal identifier includes a personal identification number associated with the at least one user.

Clause 17. The method according to clause 10, 11, 12, 13, 14, 15 or 16, the data being exchanged, further comprises sub-data needed to convert a digital item into a physical item.

Clause 18. A system may include: non-transient computer memory, storing software instructions; and at least one processor of a first computing device associated with a user; where, when the at least one processor executes the software instructions, the first computing device is programmed to: dynamically determine, by at least one processor, in an augmented reality, an identity of at least one user of a plurality of users based on a multi-factor authentication; utilize, by the at least one processor, an identity tokenizer module to automatically generate at least one temporary identity token associated with the identity of the user for a first predetermined period of time; transmit, by the at least one processor, the at least one temporary identity token to an external computing device for authentication of the identity of the user; receive, by the at least one processor, in response to the transmitting of the at least one temporary identity token, an authenticated digital token from the external computing device to utilize the authenticated digital token for a second predetermined period of time; automatically utilize, by the at least one processor, the authenticated digital token to retrieve a plurality of data items of an account information, stored in an encrypted form from a pre-generated database of encrypted data records; automatically utilize, by the at least one processor, a security module to dynamically link the authenticated digital token and the plurality of data items; generate, by the at least one processor, a unique-universal identifier associated with the security module and the authenticated digital token to automatically authenticate a plurality of activities; and utilize, by the at least one processor, the unique-universal identifier and the security module associated with the authenticated digital token to transmit instructions to a plurality of entities to exchange data in real-time to execute the plurality of activities in a physical realm.

Clause 19. The system according to clause 18, where the unique-universal identifier includes a personal identification number associated with the at least one user.

Clause 20. The system according to clause 18 or 19, where the software instructions further include inputting, by at least one processor, the data being exchanged into a trained machine learning algorithm to dynamically predict a frequency of encrypted data retrieved by the authenticated digital token.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:
1. A computer-implemented method comprising:
automatically determining, by at least one processor, in an augmented reality, an identity of at least one user of a plurality of users based on a multi-factor authentication;
automatically utilizing, by the at least one processor, an identity tokenizer module to automatically generate at least one temporary identity token associated with the identity of the user for a first predetermined period of time;
transmitting, by the at least one processor, the at least one temporary identity token to an external computing device for authentication of the identity of the user;
receiving, by the at least one processor, in response to the transmitting of the at least one temporary identity token, an authenticated digital token from the external computing device to utilize the authenticated digital token for a second predetermined period of time;
automatically utilizing, by the at least one processor, the authenticated digital token to retrieve a plurality of data items of an account information, stored in an encrypted form from a pre-generated database of encrypted data records;
automatically utilizing, by the at least one processor, a security module to dynamically link the authenticated digital token and the plurality of data items;
generating, by the at least one processor, a unique-universal identifier associated with the security module and the authenticated digital token to automatically authenticate a plurality of activities; and utilizing, by the at least one processor, the unique-universal identifier and the security module associated with the authenticated digital token to transmit instructions to a plurality of entities to exchange data in real-time to execute the plurality of activities in a physical realm.

2. The computer-implemented method of claim 1, wherein the automatically determining, by the at least one processor, in the augmented reality, the identity of the at least one user based on the multi-factor authentication, further comprises:
   interacting, by the at least one processor, with an augmented reality device associated with the user to obtain at least one bio-metric factor to identify the identity of the at least one user.

3. The computer-implemented method of claim 1, wherein the at least one temporary identity token is associated with a plurality of types of activities.

4. The computer-implemented method of claim 1, wherein the external computing device is associated with at least one entity to be utilized by the at least one user within the augmented reality.

5. The computer-implemented method of claim 2 wherein the receiving of the authenticated digital token comprises:
   receiving, by the at least one processor, a confirmation of the external computing device, authenticating the temporary identity token based on an analysis of the identity of the user and the at least one bio-metric factor associated with the augmented reality device.

6. The computer-implemented method of claim 2, wherein the security module communicates with the augmented reality device.

7. The computer-implemented method of claim 1, wherein the unique-universal identifier comprises a personal identification number associated with the at least one user.

8. The computer-implemented method of claim 1, wherein the data being exchanged, further comprises sub-data needed to convert a digital item into a physical item.

9. The computer-implemented method of claim 1, further comprising:
   inputting, by at least one processor, the data being exchanged into a trained machine learning algorithm to dynamically predict a frequency of encrypted data retrieved by the authenticated digital token.

10. A computer-implemented method comprising:
    dynamically determining, by at least one processor, in an augmented reality, an identity of at least one user of a plurality of users based on a multi-factor authentication;
    utilizing, by the at least one processor, an identity tokenizer to automatically generate at least one temporary identity token associated with the identity of the user for a first predetermined period of time;
    transmitting, by the at least one processor, the at least one temporary identity token to an external computing device for authentication of the identity of the user;
    receiving, by the at least one processor, in response to the transmitting of the at least one temporary identity token, an authenticated digital token from the external computing device to utilize the authenticated digital token for a second predetermined period of time;
    automatically utilizing, by the at least one processor, the authenticated digital token to retrieve a plurality of data items of an account information, stored in an encrypted form from a pre-generated database of encrypted data records;
    utilizing, by the at least one processor, a machine learning algorithm to dynamically predict a frequency of encrypted data retrieved by the authenticated digital token;
    automatically utilizing, by the at least one processor, a security module to dynamically link the authenticated digital token, the predicted frequency of encrypted data, and the plurality of data items;
    generating, by the at least one processor, a unique-universal identifier associated with the security module and the authenticated digital token to automatically authenticate a plurality of activities; and
    utilizing, by the at least one processor, the unique-universal identifier and the security module associated with the authenticated digital token to transmit instructions to a plurality of entities to exchange data in real-time to execute the plurality of activities in a physical realm.

11. The computer-implemented method of claim 10, wherein, in the augmented reality, the at least one user utilizes an augmented reality device that utilizes at least one bio-metric factor to identify the identity of the at least one user.

12. The computer-implemented method of claim 10, wherein the at least one temporary identity token is associated with a plurality of types of activities.

13. The computer-implemented method of claim 10, wherein the external computing device is associated with at least one entity to be utilized by the at least one user within the augmented reality.

14. The computer-implemented method of claim 12 wherein the receiving of the authenticated digital token comprises a confirmation of the external computing device authenticating the temporary identity token based on an analysis of the identity of the user and the at least one bio-metric factor associated with the augmented reality device.

15. The computer-implemented method of claim 10, wherein the security module is hosted within the augmented reality device.

16. The computer-implemented method of claim 10, wherein the unique-universal identifier comprises a personal identification number associated with the at least one user.

17. The computer-implemented method of claim 10, wherein the exchange data comprises data needed to convert a digital item into a physical item.

18. A system comprising:
    a non-transient computer memory, storing software instructions; and
    at least one processor of a first computing device associated with a user;
        wherein, when the at least one processor executes the software instructions, the first computing device is programmed to:
            dynamically determine, by at least one processor, in an augmented reality, an identity of at least one user of a plurality of users based on a multi-factor authentication;
            utilize, by the at least one processor, an identity tokenizer to automatically generate at least one temporary identity token associated with the identity of the user for a first predetermined period of time;
            transmit, by the at least one processor, the at least one temporary identity token to an external computing device for authentication of the identity of the user;

receive, by the at least one processor, in response to the transmitting of the at least one temporary identity token, an authenticated digital token from the external computing device to utilize the authenticated digital token for a second predetermined period of time;

automatically utilize, by the at least one processor, the authenticated digital token to retrieve a plurality of data items of an account information, stored in an encrypted form from a pre-generated database of encrypted data records;

automatically utilize, by the at least one processor, a security module to dynamically link the authenticated digital token and the plurality of data items;

generate, by the at least one processor, a unique-universal identifier associated with the security module and the authenticated digital token to automatically authenticate a plurality of activities; and utilize, by the at least one processor, the unique-universal identifier and the security module associated with the authenticated digital token to transmit instructions to a plurality of entities to exchange data in real-time to execute the plurality of activities in a physical realm.

19. The system of claim 18, wherein the unique-universal identifier comprises a personal identification number associated with the at least one user.

20. The system of claim 18, wherein the software instructions further comprise utilizing a machine learning algorithm to dynamically predict a frequency of encrypted data retrieved by the authenticated digital token.

\* \* \* \* \*